United States Patent
Torgersen et al.

(10) Patent No.: US 8,513,525 B2
(45) Date of Patent: Aug. 20, 2013

(54) STRIPPABLE SEMICONDUCTIVE COMPOSITION COMPRISING LOW MELT TEMPERATURE POLYOLEFIN

(75) Inventors: Ulf Torgersen, Ytterby (SE); Ola Fagrell, Stenungsund (SE); Karl-Michael Jäger, Göteborg (SE); Eric Marsden, Rogersville, AL (US); Dominic Kung, Basking Ridge, NJ (US)

(73) Assignee: Borealis AG, Vienna (AT)

( * ) Notice: Subject to any disclaimer, the term of this patent is extended or adjusted under 35 U.S.C. 154(b) by 274 days.

(21) Appl. No.: 12/988,526

(22) PCT Filed: May 4, 2009

(86) PCT No.: PCT/EP2009/003187
§ 371 (c)(1),
(2), (4) Date: Jan. 20, 2011

(87) PCT Pub. No.: WO2009/143952
PCT Pub. Date: Dec. 3, 2009

(65) Prior Publication Data
US 2011/0114365 A1    May 19, 2011

(30) Foreign Application Priority Data

May 27, 2008 (EP) .................................... 08009637

(51) Int. Cl.
*H01B 7/00* (2006.01)
(52) U.S. Cl.
USPC .............. 174/110 R; 174/120 R; 174/120 SR
(58) Field of Classification Search
USPC .............. 174/110 R, 110 A–110 PM, 110 SC, 174/102 R, 102 SC, 105, 106 R
See application file for complete search history.

(56) References Cited

U.S. PATENT DOCUMENTS

| 4,286,023 A | 8/1981 | Ongchin | |
|---|---|---|---|
| 6,525,119 B2 * | 2/2003 | Tsukada et al. | 524/263 |
| 6,706,791 B2 * | 3/2004 | Tsukada et al. | 524/261 |
| 2001/0014709 A1 * | 8/2001 | Tsukada et al. | 524/269 |
| 2002/0032258 A1 * | 3/2002 | Tsukada et al. | 524/261 |

FOREIGN PATENT DOCUMENTS

| EP | 0 420 271 | 12/1994 |
|---|---|---|
| EP | 1916673 A1 * | 10/2006 |
| EP | 1 916 673 | 4/2008 |
| EP | 1634913 A1 * | 4/2008 |
| EP | 1 634 913 | 10/2008 |
| JP | 02 153952 | 6/1990 |
| WO | WO 99/20690 | 4/1999 |
| WO | WO 2005/031761 | 4/2005 |
| WO | WO 2005-031761 A1 * | 4/2005 |

OTHER PUBLICATIONS

International Search Report mailed Jul. 2, 2009 for International application No. PCT/EP2009/003187.
Written Opinion mailed Jul. 2, 2009 for International application No. PCT/EP2009/003187.
Observations on Written Opinion mailed Mar. 25, 2010 for International application No. PCT/EP2009/003187.
International Preliminary Report on Patentability mailed May 31, 2010 for International application No. PCT/EP2009/003187.

* cited by examiner

*Primary Examiner* — William H Mayo, III
(74) *Attorney, Agent, or Firm* — Fay Sharpe LLP

(57) ABSTRACT

The present invention relates to a semiconductive polymer composition having easily controllable stripping characteristics, especially for an electric power cable. The semiconductive polymer composition has an ethylene copolymer having polar co-monomer units, wherein the amount of the polar co-monomer units in the ethylene copolymer is 10 wt. % or more, based on the total weight of the ethylene copolymer; an olefin copolymer having propylene monomer units and monomer units of an alpha-olefin having at least 4 carbon atoms, wherein the olefin copolymer has a melting point of 110 ° C. or less, and carbon black in an amount of from 10 to 50 wt. %, based on the total weight of the semiconductive polymer composition, wherein the olefin copolymer (B) is prepared by using a metallocene polymerization catalyst.

18 Claims, No Drawings

STRIPPABLE SEMICONDUCTIVE COMPOSITION COMPRISING LOW MELT TEMPERATURE POLYOLEFIN

BACKGROUND OF THE INVENTION

The present invention relates to a semiconductive polymer composition having easily controllable stripping characteristics, especially for an electric power cable. The present invention further relates to the use of such a semiconductive polymer composition and an electric power cable comprising at least one layer comprising said semiconductive polymer composition.

Electric power cables for medium to high voltages normally include one or more metal conductors surrounded by an insulating material like a polymer material such as an ethylene polymer.

In power cables, the electric conductor is usually coated first with an inner semiconducting layer, followed by an insulating layer, then an outer semiconducting layer, followed by optional layers such as water-barrier layers and on the outside optionally a sheath layer. The layers of the cable are commonly based on different types of ethylene polymers.

The insulating layer and the semiconducting layers normally consist of ethylene homo- and/or copolymers which are preferably crosslinked. LDPE (low density polyethylene, i.e. polyethylene prepared by radical polymerization at a high pressure) crosslinked by adding peroxide, e.g. dicumyl peroxide, in connection with the extrusion of the cable, has recently become the predominant cable insulating material. The inner semiconducting layer normally comprises an ethylene copolymer, such as an ethylene-vinyl acetate copolymer (EVA), ethylene methylacrylate copolymer (EMA), ethylene ethylacrylate copolymers (EEA), ethylene butylacrylate copolymer (EBA). The composition of the outer semiconducting layer differs depending on whether it has to be strippable or not.

A common concept for making an semiconductive layer strippable from an usually non-polar insulation layer is to increase the polarity of the semiconductive layer. This is e.g. done by the addition of highly polar acrylonitrile-butadiene rubber (NBR) to the semiconductive composition which e.g. further comprises an ethylene copolymer, such as an ethylenevinyl acetate copolymer (EVA) and sufficient carbon black to make the composition semiconducting.

As an example of a strippable composition, mention may be made of EP-B1-0 420 271 which discloses a semiconducting insulation shielding composition for electric cables which, based on the total weight of the composition, consists essentially of (A) 40-64% by weight of an ethylene-vinyl acetate copolymer with 27-45% of vinyl acetate, (B) 5-30% by weight of an acrylonitrile-butadiene copolymer with 25-55% of acrylonitrile, (C) 25-45% by weight of carbon black having a surface area of 30-60 m$^2$/g, and (D) 0.2-5% by weight of an organic peroxide crosslinking agent. In addition, the composition may include 0.05-3% by weight of conventional additives.

As a further example of prior art, strippable semiconducting compositions for electric cables, mention may be made of U.S. Pat. No. 4,286,023 which discloses a polymer composition for electric cables comprising (A) an ethyl-ene copolymer selected from the group consisting of ethylene-alkyl acrylate copolymers containing about 15-45% by weight of alkyl acrylate, said alkyl acrylate being selected from the group consisting of $C_1$-$C_8$ alkyl esters of (meth)acrylic acid, such as methyl acrylate, ethyl acrylate, methyl methacrylate, butyl acrylate, 2-ethyl-hexyl acrylate and the like, and ethylene-vinyl acetate copolymers containing about 15-45% by weight of vinyl acetate, (B) a butadiene-acrylonitrile copolymer (nitrile rubber) containing about 10-50% by weight of acrylonitrile (C) conductive carbon black, and (D) a peroxide crosslinking agent, wherein the weight ratio A:B=1:9 to 9:1; C:(A+B)=0.1 to 1.5, and D is present in an amount of 0.2-5% by weight of the total composition.

Although prior art compositions for semiconducting layers in electric cables are satisfactory for many applications, there is always a desire to improve their characteristics and eliminate or reduce any disadvantages they may have.

Furthermore, WO 99/20690 discloses an inner semiconducting composition for electric cables which, based on the total weight of the composition, comprises
  (a) 30-90% by weight of an ethylene copolymer,
  (b) carbon black to make the composition semiconducting,
  (c) 0-8% by weight of a peroxide crosslinking agent,
  (d) 0-8% by weight of conventional additives,
wherein the ethylene copolymer (a) is an ethylene-methyl (meth)acrylate copolymer. It is reported that the use of EMA improves the thermostability of the polar copolymer and the composition containing the same. Thus, the composition can be heated to higher temperatures, e.g. during compounding and crosslinking in other known compositions. Consequently, a higher production rate during compounding and a higher line speed during cable production is possible.

BRIEF SUMMARY OF THE INVENTION

It is the object of the present invention to provide a new semiconductive polyolefin composition suitable for a semiconductive layer of a power cable which is strippable and which allows for an easy adjusting of its stripping characteristics according to specific needs.

Moreover, it is a further object of the present invention to provide a strippable semiconductive copolymer composition which is easily processable, which has sufficient thermooxidative stability, compounding consistency and has improved handling properties.

The above objects are achieved by the present invention by providing a semiconductive polymer composition comprising
  (A) an ethylene copolymer comprising polar co-monomer units, wherein the amount of the polar co-monomer units in the ethylene copolymer is 10 wt. % or more, based on the total weight of the ethylene copolymer,
  (B) an olefin copolymer comprising propylene monomer units and monomer units of an alpha-olefin having at least 4 carbon atoms, wherein the olefin copolymer has a melting point of 110° C. or less, and
  (C) carbon black in an amount of from 10 to 50 wt. %, based on the total weight of the semiconductive polymer composition,
wherein the olefin copolymer (B) is prepared by using a metallocene polymerization catalyst.

Furthermore, the present invention provides a power cable comprising a conductor, an insulating layer and at least one semiconductive layer wherein at least one semiconductive layer comprises the semiconductive polymer composition as mentioned above.

DETAILED DESCRIPTION OF THE INVENTION

In the art it is common knowledge that for such a strippable semiconductive layer adjacent to an insulating layer which usually made of a rather non-polar composition e.g. a polyethylene composition, a comparatively polar polymer composition is to be used, so as to facilitate the stripping.

It has now surprisingly been found that contrary to the expectations in the art, an olefin copolymer as defined in the present invention is highly suitable in a semiconductive layer of a power cable to enable easy stripping of the semiconductive layer from an adjacent insulating layer. Furthermore, the strippability of the semiconductive composition of the invention can easily be adjusted according to e.g. different industry standards.

Still further, it is an advantage of the present invention that the semiconductive composition does not comprise NBR, which has a chewing-gum like consistency and thus gives rise to handling and dosing problems. Usually, NBR is produced and shipped in large bundles which must, prior to compounding, be grained or cut into smaller pieces in a special processing step. Therefore, the use of NBR is inconvenient for continuously feeding it into the compounding mixer.

The olefin copolymer used in the present invention can easily be handled, e.g. in the form of pellets, and can easily be dosed upon formation of the composition without any special graining or cutting processing step. Hence, the compounding process and the compounding consistency and consequently the product consistency are very much improved by replacing NBR.

Also the thermo-oxidative properties of the composition are also improved, which leads to less degradation upon processing. NBR contains a lot of double bonds that easily reacts with oxygen in the air, during the compounding step resulting in thermo-oxidative degradation which might result in lump formation in the final composition. The olefin copolymer contains a limited number of double bonds and is not so easy to oxidize leading to less degradation upon processing and in a more consistent product. Alternatively, the improved thermo-oxidative properties can be utilized using higher processing temperature e.g. higher throughput in the compounding machine.

Finally, the olefin copolymer matches better with a base resin during compounding, leading to a simpler formulation which shows substantially decreased stickiness. In a composition containing very sticky NBR a compabilitiser, lubricants like waxes, stearates or silicones etc. and parting agent are necessary to get a homogeneous final free flowing composition. When using the olefin copolymer in the composition according to the present invention, these disadvantages due to the stickiness of NBR are overcome, thus the above additives may be omitted or their amount may be reduced.

The invention is characterized i.a. by using a metallocene polymerization catalyst in the preparation of the olefin copolymer (B). It was surprisingly found that the inventive selection of a metallocene polymerization catalyst provides for superior mechanical properties as well as processing properties of the final semiconductive polymer composition.

With the use of a metallocene polymerization catalyst it has surprisingly become possible to improve the property profile of a strippable semiconductive polymer composition compared to a semiconductive polymer composition prepared by a conventional Ziegler catalyst. In particular, the temperature cable manufacture processing window is much higher when using a metallocene catalyst. Thus, the processing temperature may be sufficiently low to avoid scorch generation due to peroxide decomposition and sufficiently high to provide for superior melt homogenisation so as to guarantee an elastic formable melt which gives an excellent surface smoothness to the polymer composition. Superior melt homogenisation may be preferably obtained by a melt temperature in an extruder of more than 25° C. above the melting point of the polymer component comprising the highest melting point.

A metallocene catalyst further lowers the Vicat softening point of the obtained olefin copolymer (B), ensures an even comonomer distribution and a narrow molecular weight distribution (Mw/Mn) which parameters contribute to the above-described enhanced property profile.

The inventive semiconductive polymer composition also needs less processing aid such as wax, parting agent (anti-caking agent), compared to compositions comprising NBR. Due to the decreased stickiness of the inventive polymer compositions compared to conventional strippable compositions using NBR as a component, the new compositions of the present invention can be stripped at higher temperatures up to at least 75° C. without any problems in strippability at comparatively low strip forces. Furthermore polymer pellets may be produced which do not stick together even at temperatures up to 70° C. The above processing aids and parting agents which are indispensable in compositions containing NBR may thus be omitted.

Preferably, the olefin copolymer (B) in the semiconductive composition comprises 40 wt. % or less, still more preferably comprises 30 wt. % or less of monomer units of an alpha-olefin having at least 4 carbon atoms. It is further preferable that the olefin copolymer (B) comprises 5 wt. % or more, monomer units of an alpha-olefin having at least 4 carbon atoms.

The alpha-olefin for incorporating one or more monomeric units into the olefin copolymer (B) may preferably be selected from the group consisting of butene, pentene, hexene, heptene, octene, nonene and decadiene.

The olefin copolymer (B) may also incorporate, in addition to the alphaolefin, a monomeric unit of ethylene with a preferred content of less than 10%.

The propylene unit may preferably be contained in the olefin copolymer (B) in an amount of 50 wt. % or more, more preferably in an amount of from 70 to 90 wt. %, based on the total weight of the olefin copolymer (B).

In a preferred embodiment the olefin copolymer consists of propylene and butene monomer units.

The melting point of the olefin copolymer preferably is 110° C. or less.

Furthermore, the melting point of the olefin copolymer (B) preferably is 100° C. or less, more preferably 90° C. or less, even more preferably 85° C. or 75° C. or less. The melting point of the olefin copolymer (B) should preferably not be lower than a range of from 50 to 55° C.

Preferably, the semiconductive composition comprises the olefin copolymer (B) in an amount of 3 wt. % or more, more preferably of 5 wt. % or more, and most preferably of 10 wt. % or more.

Furthermore, the semiconductive composition preferably comprises the olefin copolymer (B) in an amount of 45 wt. % or less, more preferably of 35 wt. % or less, and most preferably of 25 wt. % or less. According to preferred embodiments of the invention the olefin copolymer (B) may be contained in an amount of from 10 to 45 wt. %, or from 5 to 15 wt. % of the total weight of the polymer composition.

The melt flow rate $MFR_2$, measured at 230° C., of the olefin copolymer (B) preferably is from 0.5 to 50 g/10 min, more preferably is from 3 to 35 g/10 min.

In one embodiment of the semiconductive composition of the invention, the olefin copolymer comprises or consists of a propylene copolymer, preferably a random propylene copolymer. The propylene copolymer may comprise a random propylene copolymer matrix with a dispersed rubber phase, such as an propylene-alpha-olefin rubber. One example is a propylene-butene rubber. The propylene copolymer may also comprise an olefin-based terpolymer such as a propylene-ethylene-alpha-olefin terpolymer. One example is a propylene-ethylene-butene terpolymer which may have elastomeric properties.

The olefin copolymer (B) may preferably have a density of 910 kg/cm$^3$ or lower, more preferably 900 kg/cm$^3$ or lower according to ASTM D792.

The semiconductive copolymer composition of the present invention preferably further comprise a polar copolymer (A). Such a polar copolymer may be any of the conventionally used polar copolymers in semiconductor copolymer compositions for power cables.

Preferably, the polar copolymer (A) is a polar olefin copolymer, more preferably a polar ethylene copolymer.

The polar comonomers contained in the polar copolymer (A) may be selected from acrylic acids, methacrylic acids, acrylates, methacrylates, acetates and/or vinyl esters.

Preferably, the polar copolymer (A) is a copolymer of ethylene with unsaturated carboxylic acid esters having preferably 4 to 8 carbon atoms or vinyl esters, preferably $C_{1-4}$ acrylates, such as methyl, ethyl, propyl or butyl (meth-)acrylates, or vinyl acetate.

Furthermore, the polar copolymer (A) may be present in the semiconductive composition in an amount of 65 wt. % or less, more preferably of 60 wt. % or less, still more preferably of 55 wt. % or less, and most preferably of 50 wt. % or less, based on the total composition.

The polar copolymer (A) preferably has a amount of polar comonomer units of 10 wt. % or more, more preferably of 20 wt. % or more, and most preferably of 25 wt. % or more.

Especially, an ethylene/vinyl acetate copolymer may be used. The copolymer may be composed of ethylene and a vinyl ester having 4 or 5 carbon atoms as main constituents. The vinyl ester preferably may be vinyl acetate, vinyl propionate or a mixture of these.

Preferably, the polar copolymer (A) has a melt flow rate $MFR_2$ (2.16 kg/190° C.) of 0.1 to 100 g/10 min, more preferably 1 to 60 g/10 min, even more preferably 5 to 50 g/10 min, and most preferably 15 to 50 g/10 min.

It is further advantageous, if the amount of the olefin copolymer (B) with respect to the sum of the polar copolymer (A) and the olefin copolymer (B) is preferably not more than 45 wt. %, more preferably not more than 25 wt. %, even more preferably not more than 20 wt. %. If the amount of the olefin copolymer (B) is greater than the above ranges, the stickiness and processability of the total semiconductive polymer composition may be deteriorated.

The semiconductive polymer composition further preferably comprises carbon black.

The amount of carbon black is at least such that a semiconducting composition is obtained. Depending on type of the used carbon black and the desired use and conductivity of the composition, the amount of carbon black can vary.

Preferably, the polymer composition comprises 10 to 50 wt. % carbon black, based on the weight of the total semiconductive composition. More preferably, the amount of carbon black is 10 to 45 wt. %, still more preferably 15 to 45 wt. % or 20 to 45 wt. %, still more preferably 30 to 45 wt. %, still more preferably 35 to 45 wt. %, and most preferably 36 to 41 wt. %.

Any carbon black can be used which is electrically conductive. Examples of suitable carbon blacks include furnace blacks and acetylene blacks. As carbon black, furnace carbon black is especially preferred.

Suitable furnace blacks may have a primary particle size of greater than 28 nm, measured according to ASTM D-3849. Many suitable furnace blacks of this category are characterized by an iodine number between 30 and 200 mg/g according to ASTM D-1510 and an oil absorption number between 80 and 300 ml/100 g according to ASTM D-2414.

Other suitable carbon blacks can be made by any other process or be further treated.

Suitable carbon blacks for semiconductive cable layers are preferably characterized by their cleanliness. Therefore, preferred carbon blacks have an ash-content of less than 0.2 wt. % measured according to ASTM-1506, a 325 mesh sieve residue of less than 30 ppm according to ASTM D-1514 and have less than 1 wt. % total sulphur according to ASTM-1619.

Most preferred are extra-clean furnace carbon blacks having an ash-content of less than 0.05 wt. % measured according to ASTM-1506, a 325 mesh sieve residue of less than 15 ppm according to ASTM D-1514 and have less than 0.05 wt. % total sulphur according to ASTM-1619.

According to a preferred embodiment, the semiconductive polymer composition further comprises a crosslinking agent.

In the context of the present invention, a crosslinking agent is defined to be any compound which can initiate radical polymerization. A crosslinking agent can be a compound capable of generating radicals when decomposed but also comprises the radicals obtained after decomposition. Preferably, the crosslinking agent contains at least one —O—O— bond or at least one —N=N— bond. More preferably, the cross-linking agent is a peroxide and/or a radical obtained therefrom after thermal decomposition.

The cross-linking agent, e.g. a peroxide, is preferably added in an amount of less than 3.0 wt. %, more preferably 0.2 to 2.6 wt. %, even more preferably 0.3 to 2.2 wt. %, based on the weight of the polymer composition. To have a good balance between scorch and crosslinking efficiency, it might be preferred to add the crosslinking agent, in particular a peroxide, in an amount of 0.4 to 1.5 wt. %, even more preferably 0.8 to 1.2 wt. %, based on the weight of the semiconductive composition.

The cross-linking agent may be added to the semiconductive composition during the compounding step (i.e. when the unsaturated polyolefin is mixed with the carbon black), or after the compounding step in a separate process, or during the semiconductive crosslinkable composition is extruded, or after the extrusion, e.g. by diffusion of cross-linking radicals from another cable layer into the semiconductive layer.

As peroxides used for crosslinking, the following compounds can be mentioned: di-tert-amylperoxide, 2,5-di(tert-butylperoxy)-2,5-dimethyl-3-hexyne, 2,5-di(tert-butylperoxy)-2,5-dimethylhexane, tert-butylcumylperoxide, di(tert-butyl)peroxide, dicumylperoxide, di(tert-butylperoxyisopropyl)benzene, butyl-4,4-bis(tert-butylperoxy)valerate, 1,1-bis(tert-butylperoxy)-3,3,5-trimethylcyclohexane, tert-butylperoxybenzoate, dibenzoylperoxide.

Preferably, the peroxide is selected from 2,5-di(tert-butylperoxy)-2,5-dimethyl-hexane, di(tert-butylperoxy-isopropyl)benzene, dicumylperoxide, tert-butylcumylperoxide, di(tert-butyl)peroxide, or mixtures thereof. Most preferably, the peroxide is tert-butylcumylperoxide The semiconductive polymer composition may comprise further additives. As possible additives, antioxidants, scorch retarders, crosslinking boosters, stabilisers, processing aids, lubricants, flame retardant additives, acid scavengers, inorganic fillers, voltage stabilizers, additives for improving water tree resistance, or mixtures thereof can be mentioned.

It is also possible to include a small amount, preferable 15% or less, of another filler in addition to the carbon black to improve properties like tear behaviour etc. The filler can also act as an acid scavenger. Ethylene vinylacetate used as a copolymer in the semiconductive formulation starts to degrade above 150° C. resulting in formation of acetic acid which provokes an increased risk for corrosion of processing equipment. Preferably inorganic fillers will neutralise the acid and reduce the acid corrosion attack. Suitable filler materials may be selected from the group consisting of calcium carbonate, talc, mica, wollastonite, barium sulfate, calcite, and hydrotalcite.

In the production of a power cable comprising a conductor, an insulating layer and at least one semiconductive layer, the inventive semiconductive copolymer composition may be contained in at least one of said semiconductive layers.

The power cable comprising the semiconductive copolymer composition of the present invention may further comprise additional layers such as water barrier layers and a sheath layer.

As mentioned above, a crosslinking agent, preferably a peroxide, can be added to the semiconductive polyolefin composition. The point in time for adding the crosslinking agent can be varied. As an example, the crosslinking agent may be added to the semiconductive crosslinkable polymer composition when the polyolefin is mixed with the carbon black in a compounding step, or after the compounding step in a separate process step. Furthermore, the crosslinking agent may be added during extrusion of the semiconductive crosslinkable polymer composition.

As a further alternative, the crosslinking agent can be added during and/or after application of the semiconductive crosslinkable polymer composition onto the substrate. In this preferred embodiment, the crosslinking agent can be provided in an external reservoir from which it can migrate into the layer comprising the semiconductive crosslinkable composition. In the context of the present invention, an "external reservoir" is a reservoir which is not part of the layer comprising the semiconductive crosslinkable composition. Preferably, the external reservoir is another layer also applied onto the substrate and containing the crosslinking agent. As explained above, the term "crosslinking agent" has to be defined in a broad sense. Thus, the other layer acting as a reservoir may comprise compounds not yet decomposed but may also comprise radicals resulting from decomposition. From the other layer, the crosslinking agent migrates to the layer comprising the semiconductive crosslinkable composition. Thus, since the crosslinking agent is provided from an external reservoir during and/or after having been applied onto the substrate, the semiconductive crosslinkable polymer composition of the present invention can be extruded without crosslinking agent or at least with a very low amount of crosslinking agent.

In a preferred embodiment, the other layer acting as an external crosslinking agent reservoir is provided adjacent to the layer comprising the semiconductive crosslinkable polymer composition to facilitate migration of the crosslinking agent. If necessary, migration is enhanced by thermal treatment of one of these layers or both layers.

When sufficient crosslinking agent has been diffused into the semiconductive crosslinkable composition, said composition can be treated under crosslinking conditions. If peroxides are used, crosslinking can be effected by raising the temperature to at least 160 to 170° C.

Usually, the semiconductive composition is processed at a temperature of at most 140° C., more preferably at a temperature of at most 135° C.

Processing comprises both a compounding step of the composition as well as the extrusion into a layer of a cable.

The present invention also pertains to an electric power cable comprising a semiconducting layer formed by the semiconductive composition as described above.

Usually, semiconducting layers are contained in medium to high voltage cables, in which a conductor core, e.g. copper or aluminum, is surrounded by an inner semiconducting layer, an insulation layer, and an outer semiconducting layer. Optionally, further shielding layers and/or a cable jacket may be present.

Preferably, at least the outermost semiconductive layer of a power cable is formed by the composition as described above.

Furthermore, preferably the insulation layer comprises an ethylene homo- or copolymer, which is preferably crosslinked.

Insulations can consist of extruded polymers included polyethylene (LDPE and HDPE), cross-linked polyethylene (XLPE), which may be water-tree resistant (WTR-XLPE) and ethylene propylene rubber (EPR). The extruded polymers may either be thermoplastic or thermoset. Thermoplastic material will deform upon subsequent heating, wheras thermoset material will tend to maintain their form at higher operating temperatures.

Finally, the present invention relates to the use of a semiconducting polymer composition as described above for the production of a semiconductive layer of an electric power cable, preferably a medium to high voltage electric power cable.

EXAMPLES

The present invention will now be described in more detail by reference to the following examples and comparative examples. Parts and % are weight based, if not specified otherwise.

1. Test Methods

Unless otherwise stated in the description or claims, the following methods were used to measure the properties defined generally above and in the claims and in the examples below. The samples were prepared according to given standards, unless otherwise stated.

(a) Melt Flow Rate

The melt flow rate was determined for propylene homo- and copolymers according to ISO 1133 at 230° C., at a 2.16 kg load ($MFR_2$).

(b) Density

The density of the materials and compositions was determined according to ASTM D792 and is given in $kg/m^3$.

(c) Melting Temperature

The melting temperature ($T_m$) of the olefin copolymer was determined according to ASTM D 3418. $T_m$ was measured with a Mettler TA 820 differential scanning calorimetry (DSC) apparatus on 3±0.5 mg samples. Melting curves were obtained during 10° C./min cooling and heating scans between −10 to 200° C. Melting temperatures were taken as the peak of endotherms and exotherms.

(d) Comonomer Content of the Polar and Alpha-olefin Copolymer

Comonomer content (wt. %) of the polar comonomer was determined in a known manner based on Fourier transform infrared spectroscopy (FTIR) determination calibrated with $^{13}$C-NMR as described in Haslam J, Willis H A, Squirrel D C. Identification and analysis of plastics, $2^{nd}$ ed. London Iliffe books; 1972. FTIR instrument was a Perkin Elmer 2000, Iscann, with a resolution of 4 $cm^{-1}$. The peak obtained for the tested comonomer was compared to the peak of polyethylene as evident for a skilled person (e.g. the peak for butyl acrylate at 3450 $cm^{-1}$ was compared to the peak of polyethylene at 2020 cm$^{-1}$). The wt. % was converted to mol % by calculation, based on the total moles of polymerizable monomers.

An alternative method to determine polar as well as the alpha-olefin comonomer content is to use an NMR-method which would give equal results to above X-ray and FTIR method. The following method, for example, gives results which are, for the purposes of the invention, equivalent to those above:

The comonomer content was determined by using $^{13}$C-NMR. The $^{13}$C-NMR spectra were recorded on Bruker 400 MHz spectrometer at 130° C. from samples dissolved in 1,2,4-trichlorobenzene/benzene-d6 (90/10 w/w).

(e) Hot Set Elongation

For verification of proper curing of the different layers in the cable constructions, the hot set elongation and permanent set were determined according to IEC 60811-2-1, by measuring thermal deformation at 200° C. and at a load of 0.2 MPa using a cable layer sample consisting of said crosslinked polyolefin composition of the invention Two dumb-bell test samples were prepared from a crosslinked cable layer consisting of a polyolefin composition to be tested by cutting a approximate 1.0 mm thick layer sample from the test cable layer in the direction along the cable axis. The other dimensions were according to said standard. In the examples given below, the test layer sample was taken from the outer semiconductive layer of the test cable by peeling said outer layer having a layer thickness of 1.0 mm from the insulation layer.

Each test sample was fixed vertically from upper end thereof in the oven and the load of 0.2 MPa was attached to the lower end of each test layer sample. After 15 min. at 200° C. in the oven, the distance between the premarked lines was measured and the percentage hot set elongation was calculated, resulting in elongation %. For permanent set %, the tensile force (weight) was removed from the test samples, then recovered at 200° C. for 5 minutes and allowed to cool at room temperature until ambient temperature was reached. The permanent set % was calculated from the distance between the marked lines.

(f) Strip Force

Cable samples of 30 cm of length were cut in cross sectional direction from a test cable which had an inner semiconductive layer with a thickness of 0.8±0.05 mm, an insulation layer with a thickness of 5.5±0.1 mm, and an outer semiconductive layer with a thickness of 1±0.1 mm. The test cables were prepared according to the method "Test cable and preparation method thereof" described below using the given inner semiconductive layer material and insulation layer material for the test sample and using the polyolefin composition to be tested as said outer semiconductive layer material. The strip force test can be made for test cable wherein said sample is in non-crosslinked or crosslinked form. The cable samples were conditioned not less than 16 hours at 23° C. and 55% relative humidity. Two cuts of 10 cm length and 10 mm apart from each other were applied with a knife through the outer semiconductive layer of said test cable in axial direction in such a depth to obtain a cut thickness corresponding to the thickness of said outer semiconductive layer (1 mm). The separation of the cut of the outer semiconductive layer was initiated manually at the cut end of the cable sample. The cable was fixed to Alwetron TCT 25 tensile testing instrument (commercially available from Alwetron). The manually separated cut part was clamped onto a wheel assembly which is fixed to a moveable jaw of said instrument. The rotation of the wheel assembly causes the separation of the jaws, and thus the peeling, i.e. separation, of said semiconductive layer from said insulation layer to occur. The peeling was carried out using a peeling angle of 90° and peeling speed of 500 mm/min. The force required to peel said outer semiconductive layer from the insulation was recorded and the test was repeated at least ten times for each test layer sample. The average force divided by the width (10 mm) of the sample was taken as said strip force and the given values (kN/m at 90° C.) represent the average strip force of the test samples, obtained from at least ten tests.

(g) Spiral Strip Test

A spiral strip test or removable field test was performed on crosslinked 20 kV cables under simulation of conditions for stripping the cables in field in warm climate. The conditions were changed by varying temperatures at which the test was performed. The test was conducted in the following manner:

Two parallel helical scores around the cable were made in the insulation shield to a depth of approximate 0.025 mm less than the specimen (insulation shield) minimum point thickness. The distance between the parallel scores were 10 mm. The cable samples were tempered in a Hereus lab oven at specified temperature. After not less than 1 h the cable samples were taken out of from the oven and the insulation shield specimen were immediately removed from the insulation by hand at a time when the cable still tempered. The insulation shield was subjected to a "pass test". The criteria for passing the test were removal of the insulation shield without tearing, breaking or leaving residual conductive material on the insulation surface which is not easily removable by light rubbing. Sanding should not be required to remove the residual material.

(h) Volume Resistivity

The volume resistivity of the semiconductive material is measured on crosslinked polyethylene cables according to ISO 3915 (1981). Cable specimens having a length of 13.5 cm were conditioned at 1 atm and 60±2° C. for 5±0.5 hours before measurement. The resistance of the outer semiconductive layer was measured using a four terminal system using metal wires pressed against the semiconductive layer. The resistance of the inner semiconductive layer was measured by cutting the cable into two halves and by removing the metallic conductor. The resistance between the conductive silver paste applied onto the specimen ends was then used to determine the volume resistivity of the inner semiconductive layer. The measurements were carried out at room temperature (20° C.) and at 90° C.

(i) Pellet Free Flowing Test

The stickiness among polymer pellets was tested according to a "pellet free flowing test" in the following manner. The test intends to simulate the press conditions expected on the bottom layer of material in a 600 kg box used for supplying this kind of material. The conditions changed by varying the temperature at which the test was performed. The test was conducted in the following manner:

500 g of pellets of the semiconductive material was weighed into a 1000 ml Mason Jar. An aluminum disc was placed on top of the material and a 2 kg weight was placed on top of the disc. This simulates the pressure, of about 1 psi (6.9·10$^3$ Pa), exerted on the bottom layer of material in a box. The specimens were tempered in a Nereus lab oven at specified temperatures. After 6 hours the jars were removed from the oven, the weight and the aluminum disc were removed and the jars were inverted for 1 minute. If material remained in the jars, it was separated from the jar, weighed, and reported.

(k) Walfer Boiling Test

The walfer boiling test was performed in accordance with AEIC CS5-94. Any outer covering and the conductor were removed. A representative cross section containing the extruded conductor shield and insulation shield, was cut from the cable. The resulting walfer having a thickness of at least 25 mils (0.64 mm) was immersed in boiling stabilized decahydronaphthalene with for five hours using the equipment specified in ASTM D2765. The walfer was then removed from the solvent and examined for shield/insulation interface continuity with a minimum of a 15-fold magnification. To pass the test after the above treatment, the insulation shield should not show any cracks and continuously adhere at 360° to the insulation.

(l) Tensile Strength at Break and Elongation at Break

Both properties were measured according to ISO 527 and are given in MPa and %, respectively.

(m) Thermo-Oxidative Ageing

The change in mechanical properties before and after thermo-oxidative ageing was measured according to IEC 60811-1-2.

(n) Oil Adsorption Number, (Dibutyl phthalate)

DBP adsorption number of the carbon black samples was measured in accordance with ASTM D2414-06a.

(o) Iodine Number

The iodine number of the carbon black samples was measured in accordance with ASTM D1510-07.

2. Materials

The ingredients given in the following Table 1 were used for the preparation of the polymer compositions. All amounts are given in parts by weight.

(a) Composition of the Outer Semiconductive Layer

The components of the outer semiconductive layer composition were those of the polyolefin composition under test. The test polyolefin compositions used in the present experimental part were polyolefin compositions of inventive examples 1-12 and the polymer compositions of comparative examples 1-3 as listed in the tables below.

The preparation of the outer semiconductive layer composition was effected by compounding the components in a Buss mixer. Accordingly, the compounding operations were made in a 46 mm continuous Buss mixer. The copolymer (A) and polyolefin (B), and additives, if any, were charged to the first hopper of the mixer. A filler-like carbon black was charged into the subsequent second hopper together with the additive(s) and the mixing was continued at 190° C. followed by pelletising. The peroxide component was charged to the pellets in a separate processing step.

(b) Production of Test Cables

The test cables were prepared using a so-called "1 plus 2 extruder set-up", in a Mailerfer extruder, supplied by Mailerfer. Thus, the inner semiconductive layer was extruded on the conductor first in a separate extruder head, and then the insulation and outer semiconductive layer are jointly extruded together on the inner semiconductive in a double extruder head. The inner and outer semiconductive extruder screw had a diameter of 45 mm and the insulation screw had a diameter of 60 mm.

Each test cable was produced at a production rate of 1.6 m/min using the same conventional production conditions e.g. crosslinking of the test cables in nitrogen in a CV-vulcanization tub. Each test cable had the following properties:

| Test cable construction | |
|---|---|
| Conductor diameter | 50 mm² Al |
| Inner semiconductive layer, thickness | 0.8 ± 0.05 mm |
| Insulation layer, thickness | 5.5 ± 0.1 mm |
| Outer semiconductive layer, thickness | 1 ± 0.1 mm |

TABLE 1

Raw materials used in the examples

| Trade name | Polymer | | MFR 2.16 kg 190° C. ASTM D1238 (g/10 min) | Density ASTM D792 (kg/cm³) | Melting point ASTM D3418 (° C.) |
|---|---|---|---|---|---|
| Escorene ® LD783. NP | EVA 1 | EVA, VA = 31% | 43 | 955 | 58 |
| Escorene ® UL 02133EN2 | EVA 2 | EVA, VA = 33% | 21 | 956 | 59 |
| Escorene ® UL00728FF | EVA 3 | EVA, VA = 28% | 7 | 952 | 70 |
| Krynac ® 34.35; Mooney viscosity (ML (1 + 4) 100° C. = 30 +/− 3 | NBR | Nitrile-butadiene rubber, (33 wt % nitrile) | — | 980 | |
| Tafmer ® XM 5070 | Copolymer 1 | PP-PB copolymer | 7 (230° C.) | | 75 |
| Tafmer ® TX1284 | Copolymer 2 | PP-PB-PE copolymer | 6 (230° C.) | | 75 |
| Carbon black | | | | | |

| Trade name | | Type | Oil adsorp nr. ASTMD2414 (ml/100 g) | Iodine nr. ASTM D1510 (mg/g) |
|---|---|---|---|---|
| Conductex ® 7051 | CB | Furnace black | 115-127 | 38-48 |
| Additives | | | | |
| TMQ | Stabiliser | TMQ (CAS 26780-96-1) | | |
| Antilux ® 654 | Processing aid | | | |
| Geo Liqua-cup D-16 organic peroxide | Peroxide | Tert-butyl cumyl peroxide (TBCP) | | |

TABLE 1-continued

Raw materials used in the examples

| | | | MFR 2.16 kg 190° C. ASTM D1238 (g/10 min) | Density ASTM D 792 (kg/cm³) | Melting point ASTM D3418 (° C.) |
|---|---|---|---|---|---|
| LE4201 | Insulation | LDPE peroxide | 1 | 923 | 111 |
| LE0592 | Inner semiconductive | EBA | 20 (MFR 21.16 kg (g/10 min)) | 1150 | 93 |

Escorene ® is a registered trademark of ExxonMobil Corporation
Krynac ® is a registered tradmark of Lanxess AG
Tafmer ® is a registered trademark of Mitsui Co., Ltd.
Conductex ® is a registered trademark of Columbian Chemicals Company
Antilux ® is a registered trademark of RheinChemie AG
LE4201 and LE0592 are commercial available insulation and semiconductive products produced by Borealis The following Table 2 lists compositions according to the invention (Example 1 to 9) and Comparative Examples (CE1 and CE2) together with selected mechanical and electrical properties.

TABLE 2

| | Test method | Ex. 1 | Ex. 2 | Ex. 3 | Ex. 4 | Ex. 5 | Ex. 6 | Ex. 7 | Ex. 8 | Ex. 9 | CE 1 | CE 2 |
|---|---|---|---|---|---|---|---|---|---|---|---|---|
| Strippable evaluation | | | | | | | | | | | | |
| EVA 1 | | 53 | 50 | 47 | 44 | 41 | | 53.3 | 50.3 | 47.3 | | 56 |
| EVA 2 | | | | | | | | | | | 48.1 | |
| EVA 3 | | | | | | | 47 | | | | | |
| Copolymer 1 | | 5 | 10 | 15 | 20 | 25 | 15 | | | | | |
| Copolymer 2 | | | | | | | | 5 | 10 | 15 | | |
| CB | | 41 | 39 | 37 | 35 | 33 | 37 | 41 | 39 | 37 | 38.1 | 43 |
| NBR | | | | | | | | | | | 8.9 | |
| stabilizer | | 1 | 1 | 1 | 1 | 1 | 1 | 0.7 | 0.7 | 0.7 | 1 | 1 |
| Processing aid | | | | | | | | | | | 3.9 | |
| SUM | | 100 | 100 | 100 | 100 | 100 | 100 | 100 | 100 | 100 | 100 | 100 |
| MFR 190° C., 21.6 kg, (g/10 min) | ISO 1133 | | | 75 | 101 | 107 | | | | | 75 | 35 |
| Peroxide | | 0.8 | 0.8 | 0.8 | 0.8 | 0.8 | 0.8 | 1 | 1 | 1 | 0.8 | 0.8 |
| Strip Forces 90 degree (kN/m) | | 3.3 | 2.1 | 2.1 | 2.3 | 2.8 | 5.1 | 3.8 | 3.4 | 33 | 3.1 | 4.6 |
| Volume resistivity (Ohm*cm) at 20° C. | ISO 3915 (1981) | 105 | 54 | 165 | 370 | 171 | 153 | 53 | 53 | 37 | 72 | 76 |
| Volume resistivity (Ohm*cm) at 90° C. | ISO 3915 (1981) | 870 | 870 | 1681 | 6670 | 9576 | 1260 | 863 | 712 | 321 | 260 | 758 |
| Mechanical properties | | | | | | | | | | | | |
| Tensile strength at break (MPa) | ISO 527 | 16.5 | 15.9 | 16.2 | 15.4 | 15.9 | 19.3 | 14.5 | 15.2 | 15.5 | 12.8 | 18 |
| Elongation at break (%) | ISO 527 | 293 | 284 | 268 | 254 | 269 | 254 | 245 | 254 | 241 | 275 | 250 |
| Walfer boiling test | AEIC CS5-94 | Pass | Pass | Pass | Pass | Pass | Pass | Pass | Pass | Pass | Pass | Pass |

The above Table 2 shows that the semiconductive polymer compositions according to the present invention have a well-balanced property profile including mechanical, stripping and electrical properties meeting the requirements for crosslinked semiconductive compositions for cables.

The following Table 3 lists compositions according to the invention and comparative Examples together with mechanical and thermo-oxidative ageing properties.

TABLE 3

| | Test method | Ex 2 | Ex 8 | CE 1 | CE 2 |
|---|---|---|---|---|---|
| Strippable evaluation | | | | | |
| EVA 1 | | 50 | 50.3 | | 56 |
| EVA 2 | | | | 48.1 | |
| Copolymer 1 | | 10 | | | |
| Copolymer 2 | | | 10 | | |
| CB | | 39 | 39 | 38.1 | 43 |
| NBR | | | | 8.9 | |
| Stabilizer | | 1 | 0.7 | 1 | 1 |
| Processing aid | | | | 3.9 | |
| SUM | | 100 | 100 | 100 | 100 |
| Peroxide | | 0.8 | 1 | 0.8 | 0.8 |
| Mechanical properties | | | | | |
| Tensile strength at break (Mpa) | ISO 527 | 15.9 | 15.2 | 12.8 | 18 |
| Elongation at break (%) After ageing in 7 days at 135° C. in oven | ISO 527 IEC 60811-1-2 | 284 | 254 | 275 | 250 |
| Tensile strength at break (Mpa) | ISO 527 | 16.1 | 14.8 | 13 | 17.8 |

TABLE 3-continued

|  | Test method | Ex 2 | Ex 8 | CE 1 | CE 2 |
|---|---|---|---|---|---|
| Elongation at break (%) | ISO 527 | 257 | 249 | 175 | 219 |
| Change in mechanical properties Before and after themo-oxidative ageing | IEC 60811-1-2 | | | | |
| Tensile strength at break (%) | | 1 | 3 | 2 | 1 |
| Elongation at break (%) | | 10 | 2 | 37 | 12.4 |
| Hot set elongation (%) | IEC 60811-2-1 | 43 | 38 | 26 | 71 |
| Permanent set (%) | IEC 60811-2-1 | 5.4 | 0 | 3.5 | 26 |

The combined properties of tensile strength at break, elongation at break, mechanical properties after thermo-oxidative ageing were clearly improved according to the present invention in comparison to conventional crosslinked strippable semiconductive compositions.

According to the above-described spiral strip test, cable samples were manufactured and tested. The results are shown in the Table 4 below.

TABLE 4

Strippable Formulations
Spiral strip test

| Product | Ex. 10 | Ex. 11 | Ex. 12 | CE 3 |
|---|---|---|---|---|
| CB | 41 | 39 | 37 | 38.1 |
| EVA 1 | 53.3 | 50.3 | 47.3 | |
| EVA 2 | | | | 48.1 |
| Stabilizer | 0.7 | 0.7 | 0.7 | 1 |
| Copolymer 2 | 5 | 10 | 15 | |
| NBR | | | | 8.9 |
| Processing aid | | | | 3.9 |
| Sum | 100 | 100 | 100 | 100 |
| Peroxide | 0.80 | 0.80 | 0.80 | 0.80 |
| Strip Force 90° (kN/m) | 3.8 | 3.4 | 3.3 | 3.1 |
| standard deviation | 0.163 | 0.098 | 0.104 | 0.235 |
| Nr of tests | 10 | 11 | 9 | 10 |
| Strip Force Spiral Cut | | | | |
| −10° C. | OK | OK | OK | OK |
| 20° C. | OK | OK | OK | OK |
| 45° C. | OK | OK | OK | OK |
| 55° C. | OK | OK | OK | OK |
| 65° C. | OK | OK | OK | break |
| 75° C. | OK | OK | OK | — |

It can be seen from the above examples that the olefin copolymer (B) according to the present invention advantageously lowers the strip force of semiconductive power cables comprising a strippable semiconductive polymer composition according to the present invention even at temperatures as high as 65° C. or 75° C., whereas the composition according to CE3 comprising an NBR component instead of the inventive olefin copolymer (B) broke on stripping already at 65° C.

The following Examples 13 to 15 and Comparative Examples CE1 and CE2 show the free flowing properties (measured according to the above-described pellet free flowing test) of pellets containing inventive polymer compositions in comparison to compositions not falling under the invention.

TABLE 5

Pellet free flowing at different temperatures

| | Ex. 13 | Ex. 14 | Ex. 15 | CE 1 | CE 2 |
|---|---|---|---|---|---|
| Strippable evaluation | | | | | |
| EVA 1 | 47 | 44 | 41 | | 56 |
| EVA 2 | | | | 48.1 | |
| Copolymer 1 | 15 | 20 | 25 | | |
| CB | 37 | 35 | 33 | 38.1 | 43 |
| NBR | | | | 8.9 | |
| Stabiliser | 1 | 1 | 1 | 1 | 1 |
| Processing aid | | | | 3.9 | |
| Sum | 100 | 100 | 100 | 100 | 100 |
| MFR 190° C., 21.6 kg, (g/10 min) | 70.5 | 101 | 107 | 75 | 35 |
| Peroxide | 0.8 | 0.8 | 0.8 | 0.8 | 0.8 |
| Parting agent (Agent added on the pellet surface to reduce stickiness) | No | No | No | Yes | No |
| Evaluation on pellets (strippable semiconductive polymer compositions) | | | | | |
| Pellet Free flowing test at 50° C. (%) | 98 | 99.5 | 100 | 97 | 98 |
| Pellet Free flowing test at 60° C. (%) | 86 | 95 | 93 | 65 | 84 |
| Pellet Free flowing test at 70° C. (%) | 2 | 17 | 22 | 0 | 1 |

It can be seen that the inventive polymer composition imparts improved free flowing properties to the produced pellets at 50° C., 60° C. and 70° C. which translates into a lower tendency of pellets to stick together at higher temperatures, enabling to omit any parting agent in the composition. The compositions according to the invention thus have also advantages in packaging and transporting the polymer pellets.

The invention claimed is:

1. A semiconductive polymer composition comprising:
   (A) an ethylene copolymer comprising polar co-monomer units, wherein the amount of the polar co-monomer units in the ethylene copolymer is 10 wt. % or more, based on the total weight of the ethylene copolymer,
   (B) an olefin copolymer comprising propylene monomer units in an amount of 50 wt % or more and monomer units of an alpha-olefin having at least 4 carbon atoms, wherein the olefin copolymer has a melting point of 110° C. or less, and
   (C) carbon black in an amount of from 10 to 50 wt. %, based on the total weight of the semiconductive polymer composition,
   wherein the olefin copolymer (B) is prepared by using a metallocene polymerization catalyst.

2. The semiconductive polymer composition according to claim 1, wherein the olefin copolymer (B) has a content of said alpha-olefin having at least 4 carbon atoms of 40 weight % or less, based on the total weight of the olefin copolymer.

3. The semiconductive polymer composition according to claim 1, wherein the olefin copolymer (B) has a content of said alpha-olefin having at least 4 carbon atoms of 5 weight % or more.

4. The semiconductive polymer composition according to claim 1, wherein the olefin copolymer (B) has a melting point of 95° C. or less.

5. The semiconductive polymer composition according to claim 1, wherein the olefin copolymer (B) further comprises ethylene monomer units.

6. The semiconductive polymer composition according to claim 5, wherein the olefin copolymer (B) has an ethylene content of not more than 10 wt. %, of the total weight of the olefin copolymer (B).

7. The semiconductive polymer composition according to claim 1, wherein the olefin copolymer (B) is present in an amount of from 3 to 40 wt. % of the total weight of the polymer composition.

8. The semiconductive polymer composition according to claim 7, wherein the olefin copolymer (B) is present in an amount of not more than 12 wt. % of the total weight of the polymer composition.

9. The semiconductive polymer composition according to claim 1, wherein the polar comonomers contained in the ethylene copolymer (A) are selected from the group consisting of acrylic acids, methacrylic acids, acrylates, methacrylates, acetates and vinyl esters.

10. The semiconductive polymer composition according to claim 1, wherein the ethylene copolymer (A) is present in the composition in an amount of from 30 to 65 wt. % of the total weight of the semiconductive composition.

11. The semiconductive polymer composition according to claim 1, wherein the weight ratio of the olefin copolymer (B) with respect to the sum of the weight of the polar copolymer (A) and the olefin copolymer (B) is not more than 20.

12. The semiconductive polymer composition according to claim 1, further comprising a basic, inorganic filler.

13. A power cable comprising a conductor, an insulation layer and at least one semiconductive layer, wherein the at least one semiconductive layer comprises a semiconductive polymer composition as defined in claim 1.

14. The power cable according to claim 13, wherein the insulating layer comprises an ethylene polymer.

15. A method of preparing an outermost semiconductive layer of a power cable, comprising:
    extruding the semiconductive polymer composition of claim 1 upon a layer of the power cable.

16. The semiconductive polymer composition of claim 1, wherein the olefin copolymer comprises from 5 wt % to 40 wt % of the alpha-olefin, and the alpha-olefin is butene.

17. The semiconductive polymer composition of claim 1, wherein the olefin copolymer further comprises less than 10 wt % of ethylene.

18. The semiconductive polymer composition of claim 1, wherein the olefin copolymer consists of the propylene monomer units and the alpha-olefin monomer units, and the alpha-olefin is butene.

* * * * *

UNITED STATES PATENT AND TRADEMARK OFFICE
CERTIFICATE OF CORRECTION

PATENT NO.       : 8,513,525 B2                                             Page 1 of 1
APPLICATION NO. : 12/988526
DATED            : August 20, 2013
INVENTOR(S)      : Torgersen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 325 days.

Signed and Sealed this

Fifteenth Day of September, 2015

Michelle K. Lee
*Director of the United States Patent and Trademark Office*